United States Patent

Wanner

[15] 3,643,915
[45] Feb. 22, 1972

[54] ELBOW COUPLING FOR LEVELER EXHAUST CONDUIT

[72] Inventor: Joseph W. Wanner, Kettering, Ohio
[73] Assignee: General Motors Corporation, Detroit, Mich.
[22] Filed: Oct. 7, 1970
[21] Appl. No.: 78,844

[52] U.S. Cl. .................................251/148, 285/162, 267/65
[51] Int. Cl. .........................F16l 5/02, F16f 9/04, F16f 9/50
[58] Field of Search ..............251/148; 285/189, 162; 267/65, 267/65 D; 180/41

[56] References Cited

UNITED STATES PATENTS

| | | | |
|---|---|---|---|
| 2,983,506 | 5/1961 | Bertsch et al. | 267/65 |
| 3,193,310 | 7/1965 | Hildner | 267/65 X |
| 3,339,910 | 9/1967 | Jackson | 267/65 |
| 3,434,746 | 3/1969 | Watts | 285/162 |
| 3,575,442 | 4/1971 | Elliott et al. | 267/65 |

Primary Examiner—William R. Cline
Attorney—W. S. Pettigrew and J. C. Evans

[57] ABSTRACT

In preferred form, a coupling assembly including a resilient seal element located through the cylindrical outer movable wall of a pneumatic leveler unit for sealing an opening therein. An elbow coupling element has a longitudinal opening through a base portion thereof, a slotted head with shoulders thereon which cooperate to define a tube elbow support and a flat surface on one side thereof supported against the seal element to hold it tightly against the wall. The coupling element and the valve element are held together by a flexible tube that has one end directed through the valve element to be held in engagement therewith; an elbow portion supported by the elbow coupling element and a tube end maintained by the elbow coupling in parallelism with the outer surface of the cylindrical wall.

5 Claims, 4 Drawing Figures

PATENTED FEB 22 1972          3,643,915

INVENTOR.
Joseph W. Wanner
BY
J. C. Evans
ATTORNEY

ELBOW COUPLING FOR LEVELER EXHAUST CONDUIT

This invention relates to tube coupling assemblies and more particularly to an improved combination seal and coupling assembly for securing a flexible tube in a generally right angle relationship with respect to a movable, cylindrical member.

Vehicle leveler units often include a movable cylindrical member that defines the outside surface of a pressurizable control chamber having an inlet connection thereto and an outlet connection adapted to be connected within a closed or a semiclosed fluid pumping system.

In such arrangements, it is desirable to directly connect an exhaust conduit on the cylindrical member so that it can be moved with the cylindrical member during extended and collapsed phases of operation of the leveler unit.

An object of the present invention is to simplify connection of a flexible tube to a cylindrical member wherein the tube has one end generally perpendicular to the cylindrical member and the opposite end of the flexible coupling in generally spaced parallelism with the outer surface of the member through an approximate 90° turn without the need for a separate elbow in the tube connection.

Still another object of the present invention is to connect a single continuous flexible tube directly through a cylindrical wall and to maintain one end thereof generally perpendicular to the wall and the opposite end of the tube in spaced parallelism with the wall of the cylindrical member by means that will seal between the perpendicular end of the tube and the wall and which will maintain a 90° elbow within the tube at the point where it passes through the wall in generally perpendicular relationship therewith.

Still another object of the present invention is to provide an improved tube coupling assembly for connecting flexible tube to a rigid cylindrical member and sealing it thereon by means that secure one end of the tube within the cylindrical member and locate it generally perpendicularly thereto and a separate elbow coupling member that defines a surface for bending the tube through 90° turn to hold it in spaced parallelism with the outer surface of the member.

Further objects and advantages of the present invention will be apparent from the following description, reference being had to the accompanying drawings wherein a preferred embodiment of the present invention is clearly shown.

IN THE DRAWINGS

Figure 1:
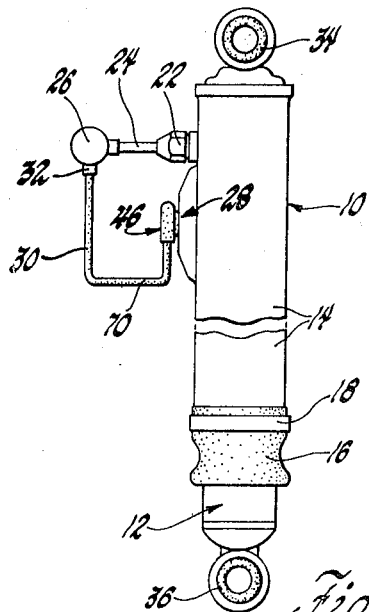
FIG. 1 is a diagrammatic view of a vehicle leveler unit including the improved coupling assembly of the present invention.

Referring now to the drawings, in FIG. 1 a vehicle leveler unit 10 is illustrated of the type that includes a shock absorber 12 having a dust tube 14 arranged in telescoping relationship therewith.

A flexible sleeve 16 has one end thereof connected by a clamp ring 18 to the dust shield 14 and the opposite end thereof is turned inwardly and connected to the outer surface of the shock absorber 12 to define a sealed, variable volume pressurizable air control chamber 20.

An inlet fitting 22 is connected to the control chamber 20. It in turn is connected through an inlet conduit 24 to the outlet of a compressor 26 for supplying pressurized air continuously into the variable volume chamber 20.

The amount of pressure in the control chamber 20 is under the control of an exhaust valve control assembly 28 which controls air flow from the compressor to and from the variable volume chamber 20.

The exhaust assembly 28 is connected to an exhaust conduit 30 which in turn connects to the inlet 32 of the compressor 26 to complete a closed loop air supply system through the variable volume chamber 20.

The leveler unit 10 is of the type adapted to be connected between the sprung and unsprung masses of the vehicle; for example, it includes a top ring mount 34 that is adapted to be connected to the frame of the chassis of a vehicle and a bottom ring mount 36 that is adapted to be connected to an unsprung mass such as the axle housing of the rear suspension of a vehicle.

Figure 2:
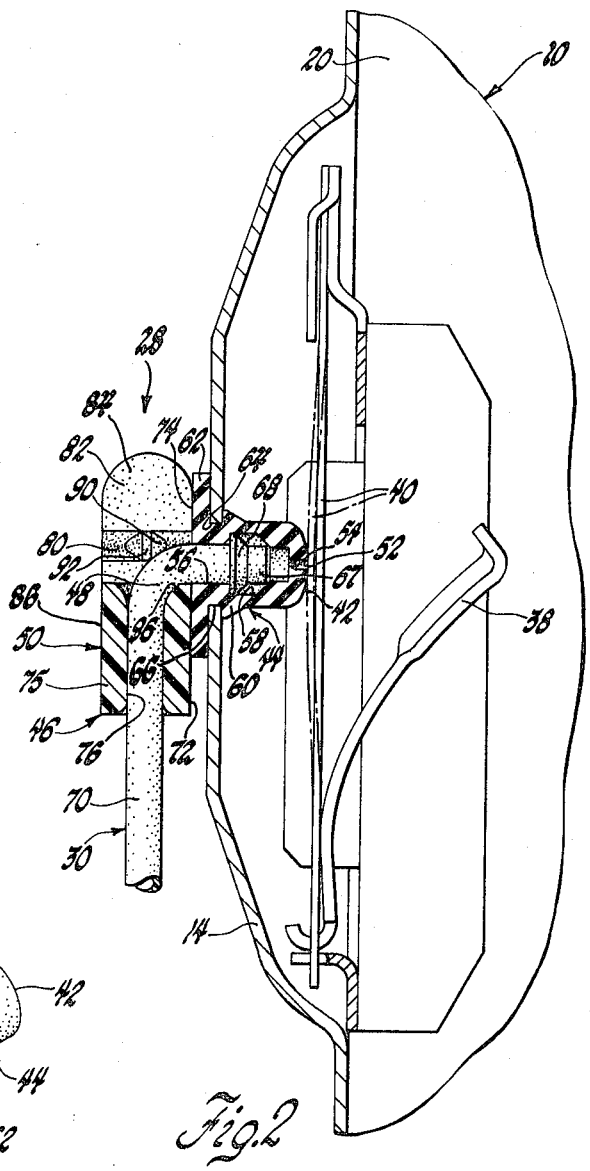
FIG. 2 is a fragmentary, enlarged vertical sectional view showing the improved coupling of the present invention in combination with a portion of a vehicle leveler unit.

When the sprung and unsprung mass are at a desired predetermined height relationship therebetween or at a preset curb height, the valve assembly 28 has an actuator arm 38 thereof located against the side of the shock absorber 12 as shown in FIG. 2 so as to cause an elongated spring valving element 40 to be deflected against a flexible valve seat end 42 of a single unitary resilient valve element 44 which forms part of an improved elbow coupling assembly 46 which in accordance with certain principles of the present invention maintains a 90° right angle turn or elbow segment 48 in the exhaust conduit 30 and sealingly connects it through the outer cylindrical dust tube 14 of the leveler unit 10.

More particularly, when the vehicle is level and the valving element 40 is in its dotted line seated relationship as shown in FIG. 2, all of the air output from the compressor 26 is trapped within the variable volume chamber 20 causing the pressure to increase therein. This in turn causes a resultant lift force on the top and bottom ring mounts 34, 36 to raise the chassis of the vehicle above the desired height relationship.

At this point, the actuator arm 38 moves across the top end cap of the shock absorber 12 and into the solid line position shown in FIG. 2, wherein the air within the control chamber 20 will escape through the valve element 44 into the exhaust conduit 30 for return to the compressor.

When this occurs, the pressure in the control chamber 20 is reduced thereby to allow the top and bottom ring mounts of the leveler unit 10 to return to a position whereby the main suspension spring associated with the leveler 10 will support the vehicle at its desired curb height.

In accordance with certain principles of the present invention, the flexible exhaust conduit 30 is held in a particular relationship with respect to the dust shield member 14 which is an air control chamber defining a movable cylindrical member in the combination.

The air-inflated leveler 10 with dust shield or movable rigid cylindrical member is illustrative of many other well-known leveler units that have an outer cylindrical member which can be used in association with the improved means of the present invention which couple a flexible tube to the cylinder for exhaust of air from the leveler to vary its auxiliary load carrying capacity.

The improved coupling assembly 46 is intended for use in all such levelers and is characterized by locating one end of the flexible conduit in a general perpendicular relationship with the wall of the movable cylindrical member and securing it in place with respect to the cylindrical member while maintaining the other end of the conduit in close spaced parallelism with the outer surface of the cylindrical member at the point that it is located exteriorly of the unit without the need for a separate right angle elbow.

The conduit 30, thus, has ends thereof located at a generally right angle with respect to each other and in accordance with certain principles of the present invention, these are connected through an integral right angle elbow segment 48 in the tube which is maintained by a unique elbow coupling element or member 50.

The valve element 44 more particularly includes an inlet opening 52 which communicates through an orifice 54 with an outlet bore 56 which has a large diameter portion 58 intermediate the ends of the valve element 44. The outlet bore 56 passes through a base 60 to the valve element 44.

The base 60 has a radially outwardly directed flaplike flange 62 thereon which is located on the outside surface of the cylindrical member 14 around and in overlying sealing relationship with an opening 64 therethrough. The cylindrical member 14 around the opening 64 therein is press fit into a groove 66 formed in the base 60 between the flange 62 and the inwardly directed valve seat or inlet end 42 of the element 44.

The conduit 30 has an end portion 67 thereon located within the large diameter portion 58 of the outlet bore 56. It has a radially outwardly directed shoulder 68 thereon which is interlockingly connected with the inside surface of the valving element 40 at the bore 56 thereon.

The end portion 67 of the conduit 30 is directed through the outlet bore 56 coaxially of the opening 60 through the cylindrical member 14 thereby to be maintained at a generally perpendicular relationship with respect to the outer surface of the cylindrical member 14.

The elbow segment 48 of the conduit 30 then bends through a right angle turn and an integral portion 70 of conduit 30 is located in generally close spaced parallelism with the outside surface of the cylindrical member 14. Thus, between the inside of the chamber 20 and the portion 70 of the conduit 30 leading to the inlet 32 of the pump 26 there is a direct continuous fluid connection which eliminates the need for sealed joints between the perpendicular portions 67, 70 of the tube.

To obtain this integral, jointless connection and in accordance with certain principles of the present invention the elbow coupling member 50 has a unique configuration including a flat surface 72 on one side thereof which engages the flat outer surface 74 of the flange 62 in sealing engagement therewith.

Additionally, the coupling member includes a base 75 having a longitudinal bore 76 therethrough which supportingly receives the segment 70 of the conduit 30 so as to locate it in its parallel relationship with the cylindrical member 14.

The bore 76 extends upwardly through the coupling member 50 to intersect a pair of spaced-apart inwardly directed ridges 78, 80 on the inside surfaces of a pair of spaced-apart upstanding arms 81, 82 respectively which together define an upper bifurcate portion on the element 50.

The arms 81, 82 are separated by a transverse slot 84 which extends from the side surface 72 to a like outwardly located side surface 86 on the coupling member 50.

Figure 3:
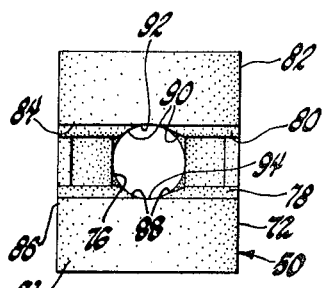
FIG. 3 is a view in top elevation of a coupling member of the present invention.
Figure 4:
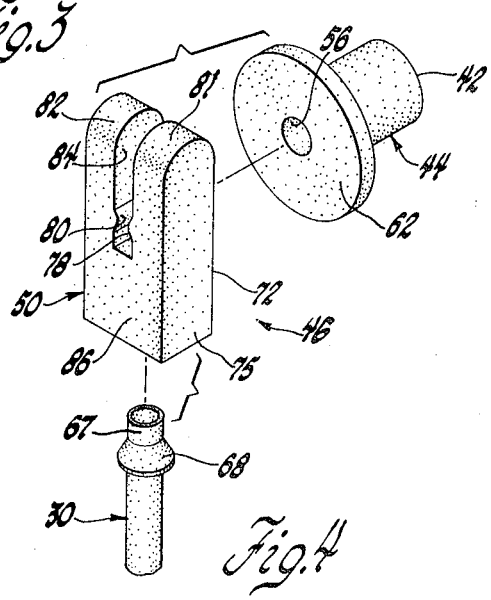
FIG. 4 is an exploded view of the component parts of the invention prior to assembly on a leveler unit.

The longitudinal bore 76 intersects the ridge 78 at surfaces 88 and the ridge 80 at surfaces 90. It also intersects a small arcuate segment of each of the arms at 92, 94 as best seen in FIG. 3.

The elbow segment 48 is bent at the spaced-apart ridges 78, 80 and directed through one side of the slot 84 and it has the inner radius thereof supported by a curved surface 96 which leads from the bore 76 into the slot 84 at surface 72.

The coupling member 50 is configured in the same manner at surface 86 and is thus adapted to have a tube bent from bore 76 in either direction of the slot 84 to extend from the side surface 72 or the side surface 86.

The cooperation of the ridges 78, 80 and the longitudinal bore 76 guides the flexible conduit 30 to form the elbow or right angle turn configuration 48 therein.

Furthermore, the elbow coupling element 50 serves to hold the resilient flange 62 tightly between the surface 72 and the outer wall of the cylindrical member 14 around the opening 64 therethrough. This tightly seals the valve element 44 at its connection to the conduit 30. The resultant effect is to have a strong, air-sealed connection between the conduit 30 and the valve element 44 at the cylindrical wall of dust shield 14. Additionally, a transition from a right angle outlet from the wall of shield 14 to a flow path parallel to the wall is accomplished. This configuration is especially suitable for use in valving elements that include a valve seat located within a pressurizable variable volume chamber against which a movable valve element is shifted between open and closed positions in the above discussed manner.

What is claimed is:

1. A coupling assembly for connecting a tube to the outer surface of a cylindrical member in spaced parallelism therewith comprising: a removable resilient seal element including an inlet portion and a base portion, means for connecting said resilient element through an opening in the wall of a cylindrical member for sealing the opening, an axial passageway through said seal element, a flexible tube having one end located within said passageway, a shoulder on said flexible tube interlockingly engaging said seal element for securing the tube in place on the seal element, an elbow coupling member having a longitudinal bore therethrough receiving the opposite end of the tube, said coupling member having a slotted upper end for supporting an elbow portion of said tube that connects the seal connected end of the tube to the other end of the tube through approximately 90°, said coupling member including a flat surface thereon in engagement with said seal element to hold it in sealed relationship with the wall, and guide surface means in the slotted end of said coupling member in engagement with the elbow segment of said tube for maintaining the 90° turn therein from said seal element to the longitudinal bore of said coupling member.

2. A coupling assembly for connecting a tube to the outer surface of a cylindrical member in spaced parallelism therewith comprising: a removable, resilient seal element including an inlet portion and a flanged base portion, means for connecting said resilient element through an opening in the wall of a cylindrical member, said flange overlying the opening in the cylindrical member when in place thereon for sealing the opening therethrough and to define a coupling seat, an axial passageway through said seal element including a large diameter internal opening, a flexible tube having one end located within said large diameter opening, a shoulder on said flexible tube interlockingly engaging said seal element at the large diameter opening therein for securing the tube in place on the seal abutment, an elbow coupling member having a longitudinal bore therethrough receiving the opposite end of the tube, said elbow coupling having a slotted upper end for supporting an elbow portion of said tube that connects the seal connected end of the tube to the other end of the tube through approximately 90°, said coupling member including a surface thereon in engagement with said seal element flange and a pair of inwardly directed surfaces in the slotted end thereof in engagement with said tube for maintaining the 90° elbow portion therein and for resiliently pressing the flange of said seal element between the surface of said coupling member and the wall of the cylindrical member.

3. A combination valve and coupling assembly comprising: a valve element having an inlet end adapted to be located interiorly of the cylindrical member to define a flexible valve seat and an exhaust end with a flange adapted to engage the outside surface of the cylindrical member, means between the inlet and exhaust end for fixedly securing the valve element in place on the cylindrical member, a flexible tube having an inlet end directed axially through said valving element, said inlet end having a connecting shoulder thereon located interiorly of said valving element in interlocking relationship therewith, a tube coupling element including a flat surface adapted to engage said flange to sealingly press it against the cylindrical member, said tube coupling element including a slotted head having a side opening and a base having a longitudinal bore therethrough, said slotted head including a pair of spaced inwardly directed surfaces thereon engaging said tube for bending it from said longitudinal bore through said side opening into said valving element, said bending surfaces and said shoulder cooperating to hold said flange tightly between said bending surfaces and the cylindrical member for sealing said tube and said valve element to the cylindrical member.

4. A valve and coupling assembly for connecting a flexible tube to the cylindrical wall of a fluid chamber comprising: a resilient valve element having an inlet end and an exhaust end with a radially outwardly directed flange, means for connecting said element through a cylindrical wall to locate said radially outwardly directed flange on the outside of the cylindrical wall to define a coupling seat and to locate the inlet end thereof within the cylindrical wall to define a valve seat, a coupling element having a bight portion and a bifurcate upper segment thereon, a longitudinal bore through said bifurcate segment and said bight portion, a pair of inwardly directed surfaces on said bifurcate segment overlying said bore to define a right angle turn from the longitudinal opening in said bight portion to one side of the bifurcate segment, a flat side surface on said coupling element in engagement with the outer surface of said flange, a flexible tube extending through said longitudinal bore having an elbow maintained by said surfaces through the right angle turn, an inlet end on said tube having a radially outwardly directed shoulder thereon, said valve element including means coacting with said shoulder for holding said coupling element side surface in tight engagement with the outer surface of said flange, passageway means through said valve element for directing fluid from the chamber in a first direction and thereby to be directed through said tube through an approximate right angle turn, said coupling element maintaining the outside end of the tube in close spaced parallelism with the outer surface of the cylindrical member.

5. A right angle coupling assembly for association with a movable cylindrical member of a pneumatic leveler unit of the type including an inlet and an outlet, and an exhaust control valve means for controlling the flow of air into and from the control chamber of the leveler unit comprising: a resilient valve element having an elongated head portion and a flanged base, means for connecting said valve element through the movable cylindrical member for replacement from the outside thereof, said valve element having the flange thereon located in sealing engagement with the outer surface of the cylindrical member when in place thereon and including an inlet therein defining a passage for flow of air from the control chamber of the leveler unit, an outlet bore directed through said flange into the inlet of said valve element, a flexible tube having one end directed through said outlet bore having a shoulder thereon interlockingly connected with the valve element, said one end of said tube being directed perpendicularly to the wall of the movable cylindrical member, an elbow coupling element located exteriorly of the movable member including a base portion and a slotted head portion defining spaced-apart arms thereon, a longitudinal bore directed through said base portion, a pair of spaced-apart inwardly directed surfaces on said arms defining an abutment between said arms, said abutment and said longitudinal opening defining a tube surface for directing an elbow portion of the tube through 90°, said elbow portion of said tube connecting said valve connected end thereof with an opposite end of the tube adapted to be connected to another portion of a leveling system, said inwardly directed surfaces and said tube shoulder pressing said elbow coupling element in tight engagement with said flange for holding the elbow coupling element in place on the side of the movable cylindrical member while holding the other end of the tube in generally spaced parallelism with the outer surface of the cylindrical member at right angles to the outlet bore through the valve element through all phases of operation of the leveler unit.

* * * * *

PO-1050
(5/69)

UNITED STATES PATENT OFFICE
CERTIFICATE OF CORRECTION

Patent No. 3,643,915  Dated February 22, 1972

Inventor(s) Joseph W. Wanner

It is certified that error appears in the above-identified patent and that said Letters Patent are hereby corrected as shown below:

Column 4, line 36, "abutment" should be -- element --.

Signed and sealed this 1st day of August 1972.

(SEAL)
Attest:

EDWARD M. FLETCHER, JR.  ROBERT GOTTSCHALK
Attesting Officer        Commissioner of Patents